No. 892,777. PATENTED JULY 7, 1908.
C. F. TOENNIES.
DETACHABLE RUNNER.
APPLICATION FILED NOV. 12, 1907.
2 SHEETS—SHEET 2.
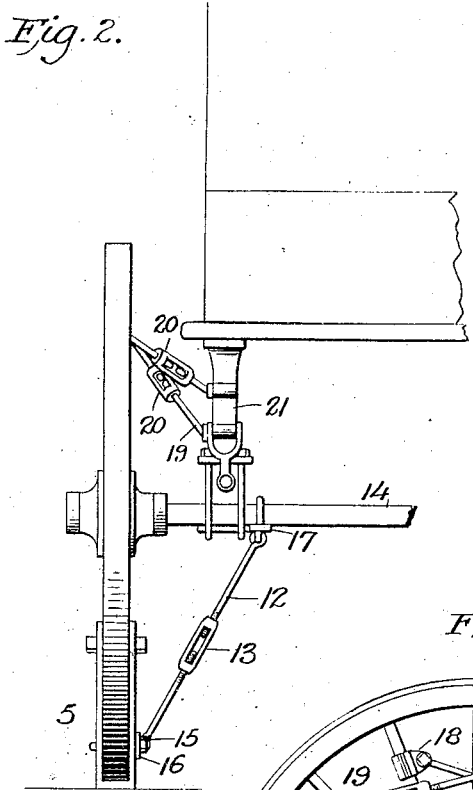
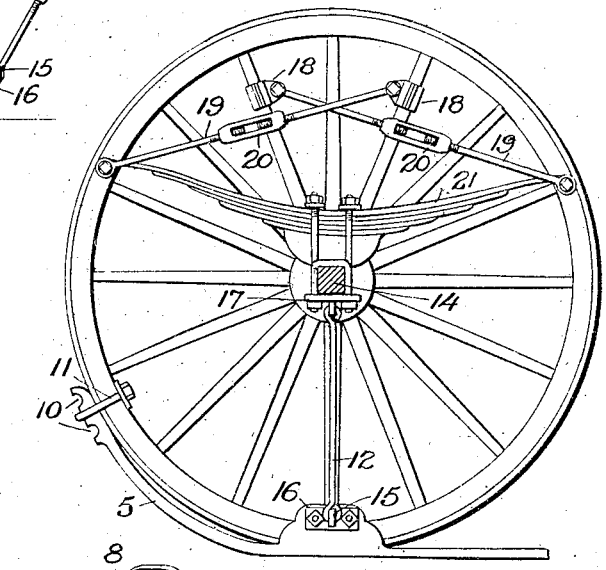
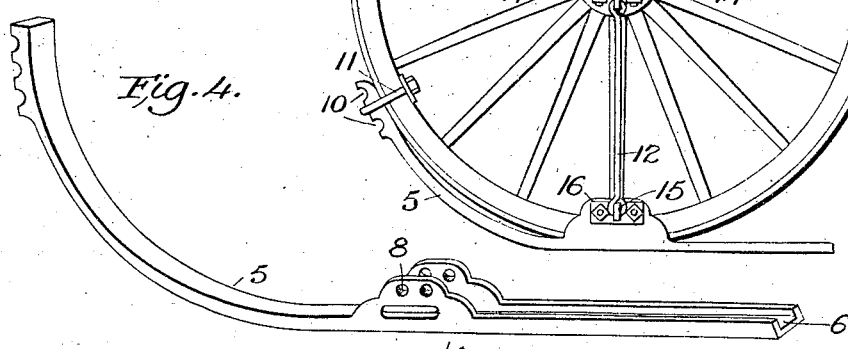
WITNESSES
James T. Duhamel
K. Allen
INVENTOR,
Charles F. Toennies,
BY
Victor J. Evans
ATTORNEYS

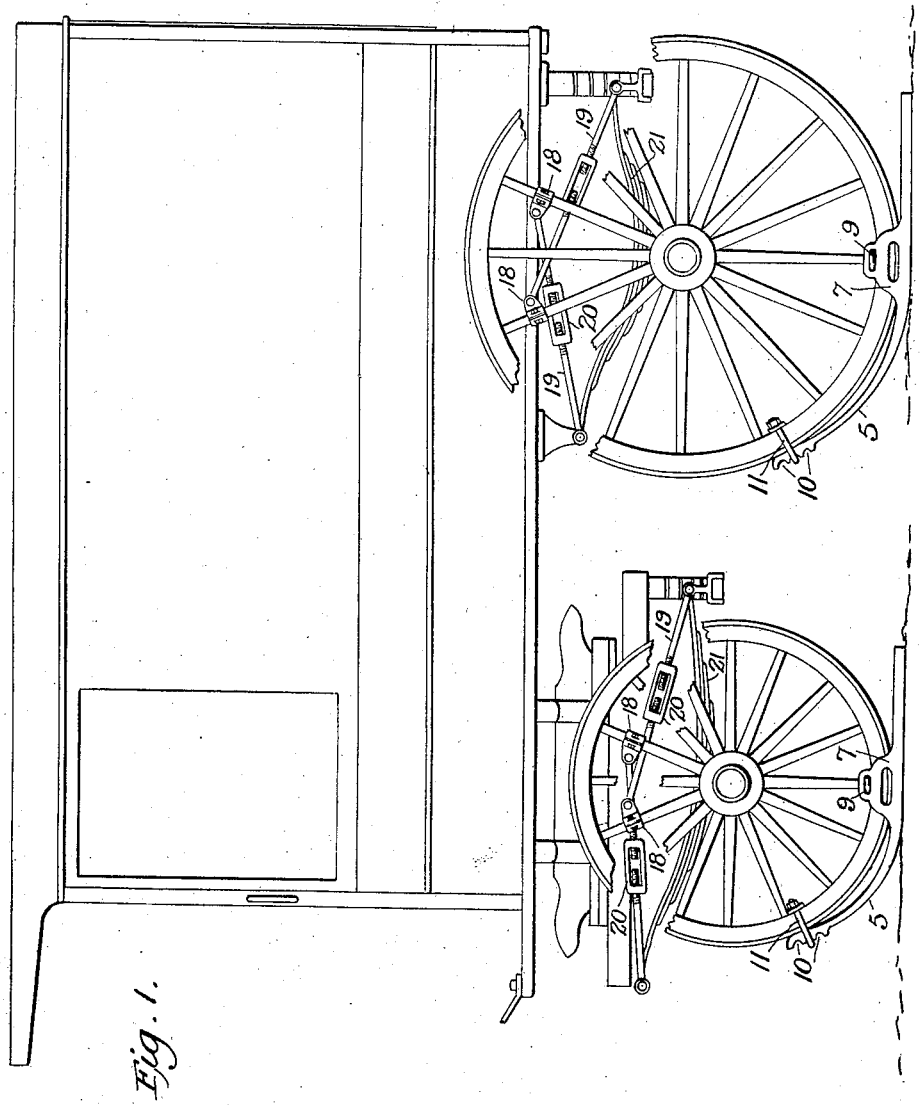

UNITED STATES PATENT OFFICE.

CHARLES F. TOENNIES, OF JERSEY CITY, NEW JERSEY.

DETACHABLE RUNNER.

No. 892,777.  Specification of Letters Patent.  Patented July 7, 1908.

Application filed November 12, 1907. Serial No. 401,893.

*To all whom it may concern:*

Be it known that I, CHARLES F. TOENNIES, a citizen of United States of America, residing at Jersey City, in the county of Hudson and State of New Jersey, have invented new and useful Improvements in Detachable Runners, of which the following is a specification.

This invention relates to sleigh runners for wagons and its object is to provide runners which may be readily attached to the wheels of a wagon and so braced as to take the place of a sleigh for use in winter when the snow is on the ground, further details and objects of the invention will be more fully described in the following specification set forth in the claims and illustrated in the drawings where:

Figure 1 is a side elevation of a wagon showing the runners applied thereto. Fig 2 is an end view of one side of a wagon. Fig. 3 is a view of one of the wheels detached and looking from the inside. Fig. 4 is a perspective view of one of the runners detached.

This invention is intended for use on the wheels of an ordinary wagon and is adapted to be fitted about the lower edge of the wheels and secured thereto. The wheels at the same time must be braced to prevent their turning and afforded such rigidity that the runners will properly operate. To accomplish this runners 5 are provided with grooves 6 in their upper surface and vertical ears 7 on each side, the latter have perforations 8 for the insertion of clips 9 to attach the runner to the spoke of the wheel. The forward end of the runner is provided with notches 10, into one of which fits the clip 11 and by which the front end of the runner is more rigidly secured to the wheel.

In order to prevent lateral movement an adjustable rod 12 with a turn-buckle 13 secures the runner to the axle 14 being attached to the eye 15 of the plate 16 which is secured by means of the clip 9 while the upper end of the rod 12 also engages an eye of the plate 17 also secured by a clip to the axle.

In order to secure the wheel against rotation clamps 18 are secured to the upper spokes and to these are secured rods 19, which are adjustable by means of the turn-buckles 20 and whose outer ends are secured to the springs 21 of the wagon. The construction of these various rods and their arrangements are the same, being connected to the spokes and also to the springs by means of suitable bolts as is clearly shown in the drawings, and such an arrangement affords a rigid connection which prevents the movement of the wheels when the wagon is pulled forward. This arrangement does not prevent the turning of the front wheels on their usual pivotal center and the device is easily connected or removed from the wheels when not desired. They may be identical in size so as to be interchangeable and fitted to every one of the wheels.

It is obvious that the detalis of construction may be departed from when found desirable without sacrificing any of the essential features above described.

What I claim as new and desire to secure by Letters Patent is:

1. In a detachable runner for vehicles, the combination with a grooved runner having notches at its forward end and provided at its center with vertical ears, and means for securing said runner to the rim of a wheel, of a lateral adjustable rod and means for securing the same to the runner and axle, and of adjustable rods, one end secured to the end of a vehicle spring, and the other provided with clamps, which are secured to the upper spokes thereby locking the wheel against rotation.

2. In a detachable runner for vehicles, the combination with a grooved runner having notches at its forward end, and provided at its center with vertical ears, apertures formed therein, for the purpose of receiving a clip, said clip securely fastening the runner to the rim of a wheel, of a lateral adjustable rod secured at one end to the runner, and at its other to the axle by clips, and of adjustable rods, one end secured to the end of the vehicle spring, and the other provided with clamps, which are secured to the upper spokes, thereby locking the wheel against rotation.

In testimony whereof, I affix my signature in presence of two witnesses.

CHARLES F. TOENNIES.

Witnesses:
JOHN MARTENSEN,
LAWRENCE WILLIAM HOERSCH.